July 26, 1932. J. F. CHARNOCK 1,869,005
SUGAR MOLDING MACHINE
Filed Aug. 20, 1929 2 Sheets-Sheet 1

INVENTOR
JOHN FRANKLIN CHARNOCK
BY HIS ATTORNEY
Myron M. Davis

July 26, 1932. J. F. CHARNOCK 1,869,005
SUGAR MOLDING MACHINE
Filed Aug. 20, 1929 2 Sheets-Sheet 2

INVENTOR
JOHN FRANKLIN CHARNOCK
BY HIS ATTORNEY
Myron M. Davis

Patented July 26, 1932

1,869,005

UNITED STATES PATENT OFFICE

JOHN FRANKLIN CHARNOCK, OF BOSTON, MASSACHUSETTS, ASSIGNOR TO HERSEY MANUFACTURING COMPANY, OF BOSTON, MASSACHUSETTS, A CORPORATION OF MASSACHUSETTS

SUGAR MOLDING MACHINE

Application filed August 20, 1929. Serial No. 387,154.

This invention relates to molding machines and is herein illustrated as embodied in a machine for molding sugar in small pieces, of the type illustrated in Letters Patent of the United States No. 225,601, granted March 16, 1880, on the application of Charles H. Hersey.

Sugar molding machines of the type illustrated in said Letters Patent embody a cylindrical drum constructed from spaced staves secured to end pieces to form a drum-like structure. The adjacent spaced edges of said staves are notched to receive partition plates, forming thereby rows of rectangularly shaped molds. The arrangement is not readily adapted for the production of molded sugar pieces of irregular shapes.

The object of the present invention is to provide an improved sugar molding machine arranged to produce molded pieces of sugar of irregular shapes corresponding, for example, to the pips of playing cards such as diamonds, hearts, and the like.

In the machine as herein illustrated, a hollow cylindrical drum is provided with a number of rows of shouldered, circular recesses for the reception of similarly shaped molds whose inner surfaces are cut in different assymmetrical shapes such as those above mentioned. Rows of plungers fitting the insides of the molds and having a common operating bar are provided within the drum to slide freely within the molds so that, after the molds have been filled, the sugar contained therein may be compressed and expelled in the form of heart or club shaped pieces or the like.

Figure 1:
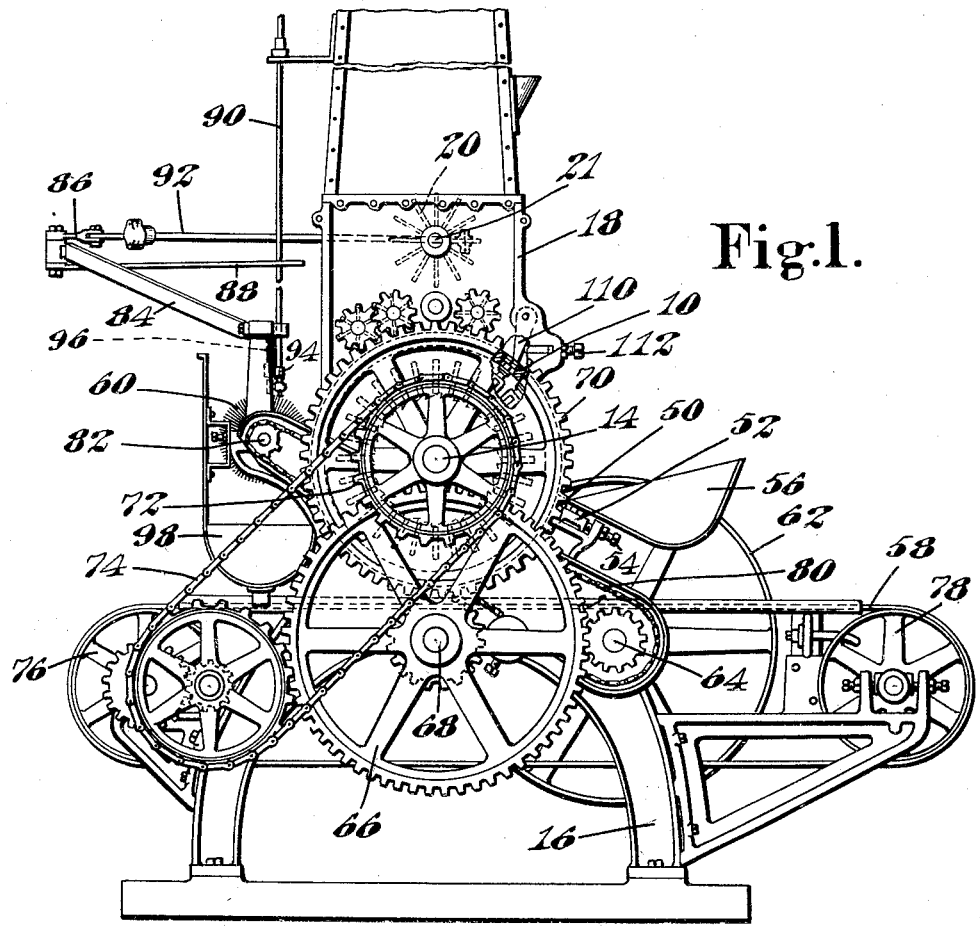
Fig. 1 is a side elevation of my novel sugar molding machine.

A cylindrical hollow drum 10 having end plates 12 is secured to a shaft 14 journaled in the frame 16 of the machine and this drum forms the bottom of a hopper 18 in which there are a plurality of driven stirrers 20 of which one set is mounted on a shaft 21. Moist sugar may be fed to the hopper 18 manually or automatically.

Figures 2, 3:
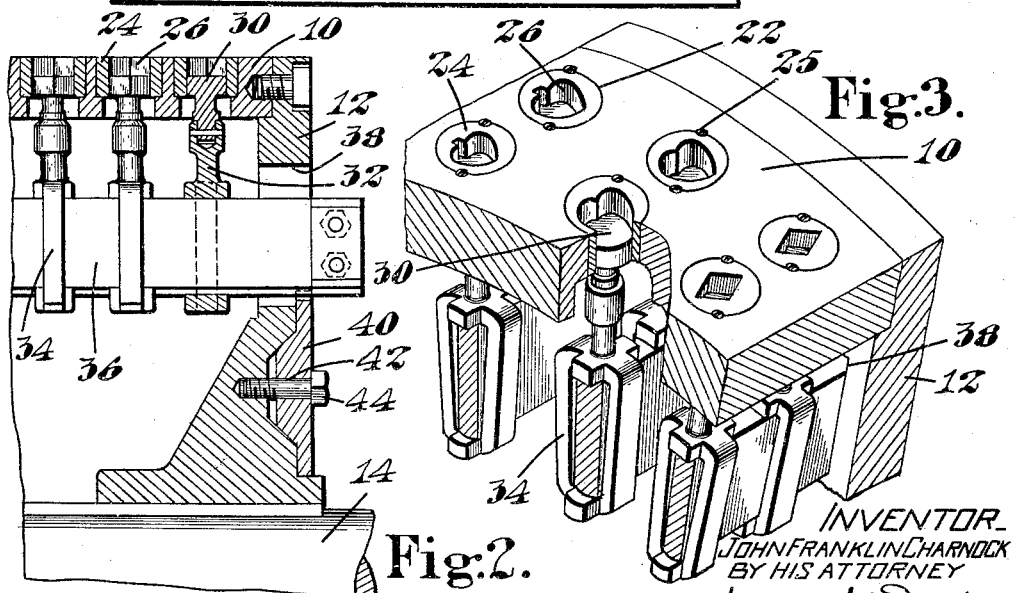
Fig. 2 is a fragmentary radial section through the drum of the machine.
Fig. 3 is a fragmentary perspective view of a portion of the drum together with the cooperating plungers.
Figure 4:
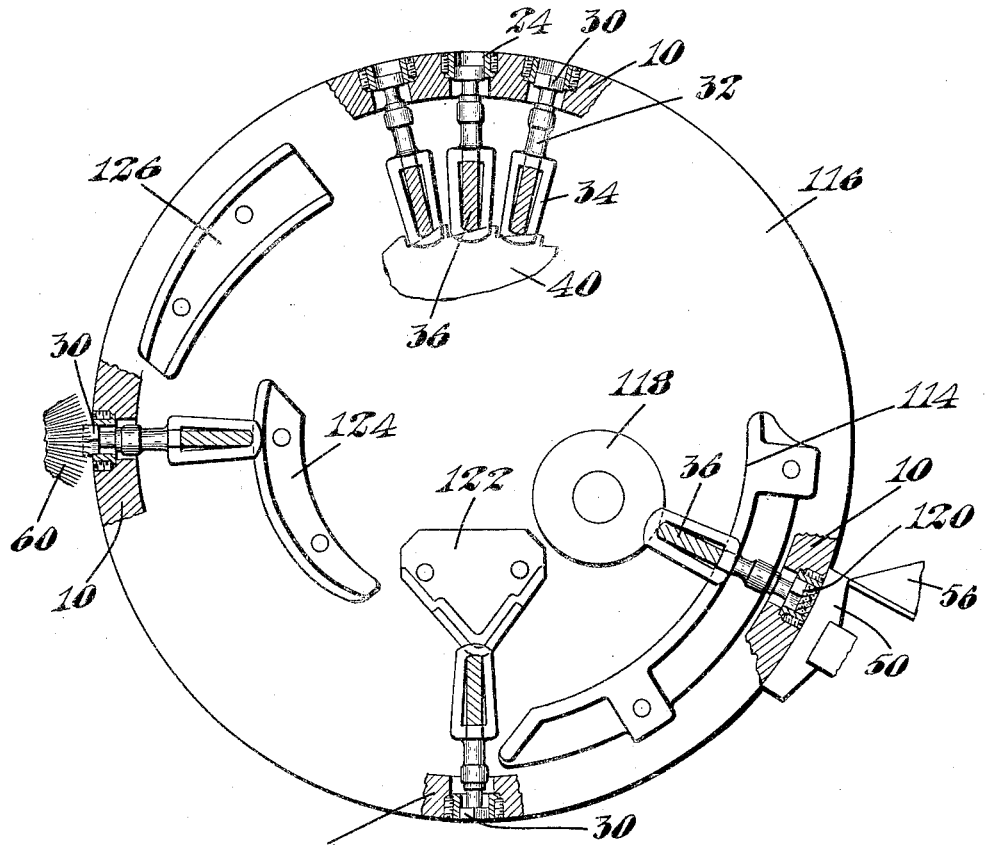
Fig. 4 is a view of one of the end plates of the machine supporting a series of operating cams which cooperate with the plunger bars.
Figure 5:
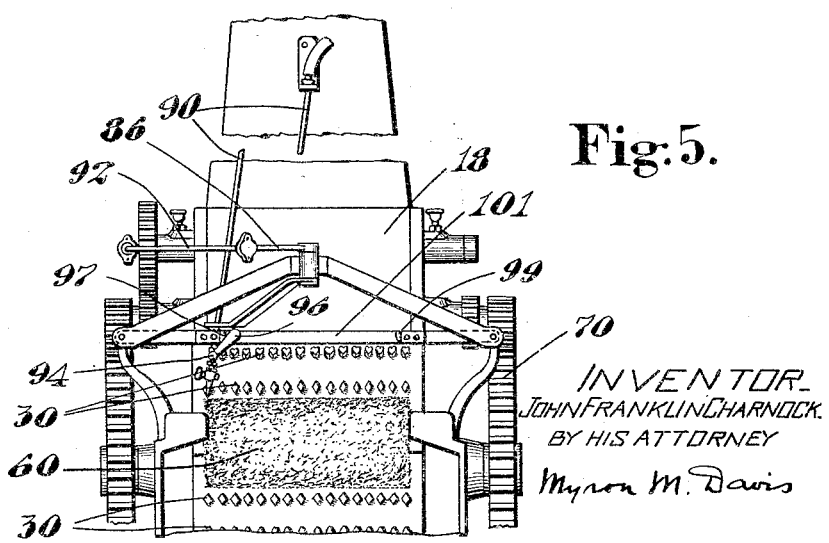
Fig. 5 is an end view of the machine showing the brush sprinkling mechanism.

The periphery of the drum 10 is provided with a plurality of rows of circular recesses 22 shouldered as shown in Fig. 2 and adapted to receive therein circular molds 24 whose internal surfaces 26 are irregularly shaped and arranged in series having the form of hearts, clubs, diamonds and spades. Fitting the interior of each of these molds is a plunger having a head 30 slidable therein. The head 30 of each plunger is secured, as by a pin, to a shank 32 having a loop-shaped portion 34 surrounding a plunger bar 36. The loop-shaped portions 34 are shaped to allow a slight lateral tipping movement circumferentially of the drum to prevent binding between the plunger heads 30 and the molds but said loop-shaped portions fit rather closely to the top and bottom surfaces of the bars 36, so that once positioned on the bar, there is little tendency to displacement of the plungers in a direction parallel to the axis of the drum. These plunger bars 36 project through slots 38 in the ends of the drum so that a row of plungers may be operated simultaneously to provide inward and outward movement of the plungers by means to be later described. When the plungers are at the top of the cylindrical drum, they drop downwardly to provide the bottoms of sugar-receiving recesses within the molds, and the limit of inward movement of the plungers is determined by a pair of similar, annular plates 40 having ratchet-like perimeters (Fig. 4) and slotted as at 42 (Fig. 2) to receive securing bolts 44 by means of which they are adjustably held in position on the ends of the drum. By loosening the bolts 44, the plates 40 may be turned slightly so as simultaneously to adjust the limit of inward movement of the plunger bars 36.

Fitting closely against the outside of the cylinder at one side of the drum is a stationary pressure bar 50 backed up by a bar 52 which may be adjustably positioned in the frame of the machine by means of screws 54. Associated with this pressure bar is a waste-catching basin 56, while beneath the drum is an endless conveyor belt 58 upon which may be mounted a succession of trays of galvanized iron, for example, to receive the compressed sugar pieces. At the other side of the drum there is provided a cleaning brush 60 positively rotated in contact with the surface of the drum and the ends of the plungers to clean the plungers before they are returned to position for the reception of more sugar.

Duplicate driving mechanism is provided at the opposite ends of the machine, which may be actuated by means of power supplied to a driving pulley 62 mounted on a shaft 64 journaled in the frame of the machine, which shaft is provided with a pinion meshing with a large gear 66 carried on a shaft 68. This shaft is also provided with pinions meshing with gears 70 at the ends of the drum. These gears 70 mesh with small gears on the stirrer shafts and concentric therewith is a sprocket 72 connected by a chain 74 and reduction gearing with one of the pulleys 76, 78 which carry the conveyor belt 58. Another chain 80 connecting sprockets on the shaft 64 and the shaft 82 of the cleaning brush 60 provides means for driving said brush.

In an offset bracket 84 mounted above the cleaning brush 60 is journaled a bell-crank lever 86 having a forked arm 88 for engagement with a rubber hose 90 through which water may be supplied to the cleaning brush 60. An offset arm 92 secured to a gear upon the shaft 21 of the uppermost stirrer 20 is connected to the other end of the bell-crank and arranged as a crank to swing the notched end 88 so as to move the lower end of the hose 90 from one end to the other of the cylindrical cleaning brush. An intermediate valve 94 in the hose is provided with a handle 96 arranged to engage stops 97 and 99 on a cross bar 101 carried by the bracket 84 to shut off the flow of water as one stop is reached and to turn it on again as the hose reaches the other end of the brush so as thereby to deliver water to the brush during half of its movement, to prevent an excessive amount of water being deposited upon the ends of the brush as compared with its middle portion. Below the brush there is a catch basin 98, provided with a suitable outlet, to receive the drippings from the brush.

The rows of molds, as they are moved successively to the top of the drum, will be filled with moist sugar from the hopper 18 and any surplus sugar is removed from the molds by means of a buffer or scraper bar 110 (Fig. 1), the end of which is adjustably positioned in close contact with the face of the cylinder by means of an adjusting screw 112. As the drum rotates, the filled molds will be brought into position opposite the stationary pressure bar 50, at which time the corresponding plunger bar 36 will ride between cam plates 114 and compression rollers 118. Similar duplicate cam plates 114 are secured to similar end plates 116 mounted in the frame of the machine and upon these end plates 116 there are also mounted the compression rollers 118. The plunger bars 36 are forced outwardly by these pressure rollers 118 to compress the sugar 120 in the row of molds opposite the pressure bar 50 to just the desired degree. The weight of these series of plungers is supported by the cam plates 114 until they have approached nearly to the bottom of the drum as they rotate therewith, whereupon they are released from the cam plates 114 and allowed to drop downwardly to force the compressed pieces of sugar on the trays (not shown) carried upon the belt 58. This downward movement is further insured by means of similar V-shaped cam plates 122 upon the opposite end plates 116. Upon continued rotation of the drum, the plunger bars come to a position where they are engaged by another pair of cam plates 124 which cause the heads 30 of the plungers to be projected slightly beyond the surface of the drum so that they may be thoroughly cleaned by the bristles of the driven cylindrical brush 60. Upon still further rotation of the drum the plunger bars engage the inner surfaces of similar cam plates 126 positively to withdraw the plungers into the molds before they approach the left side of the hopper 18.

It is believed that the operation of the machine will be apparent from the previous description, but it will be understood that sugar is supplied continuously from the mixers of the factory to the hopper 18 and that the trays filled with rows of sugar pieces are removed from the belt 58 and carried to suitable drying ovens, which harden them so that they are ready to be packed for the market.

Having thus described my invention, what I claim as new and desire to secure by Letters Patent of the United States is:

In a sugar molding machine, a drum of cylindrical form, a multiplicity of separate molds mounted in said drum for removal independently of each other, said molds being arranged in a plurality of series with each series extending axially of the drum and the individual molds of each series being alined in the periphery of the drum, plungers associated, respectively, with said molds and each fitting the interior of its respective mold, operating bars for the plungers of the respective series of molds, each bar serving to operate all of the plungers for a single series of molds, a pressure bar cooperating with the peripheral surface of the drum to close the outer ends simultaneously of a series of molds, and means for operating said bars successively to compress the sugar in the molds against said pressure bar.

In testimony whereof I have signed my name to this specification.

JOHN FRANKLIN CHARNOCK.